Aug. 14, 1951 S. A. BOWERS 2,564,461
INSTRUMENT FOR USE IN LEVELING RAILWAYS
Filed April 30, 1947 2 Sheets-Sheet 1

Inventor
Samuel A. Bowers

By Clarence A. O'Brien
and Harvey B. Jacobson
Attorneys

Aug. 14, 1951  S. A. BOWERS  2,564,461
INSTRUMENT FOR USE IN LEVELING RAILWAYS
Filed April 30, 1947  2 Sheets-Sheet 2

Inventor
Samuel A. Bowers

By Clarence A. O'Brien
and Harvey B. Jacobson
Attorneys

Patented Aug. 14, 1951

2,564,461

UNITED STATES PATENT OFFICE 2,564,461

INSTRUMENT FOR USE IN LEVELING RAILWAYS

Samuel A. Bowers, Dupo, Ill.

Application April 30, 1947, Serial No. 744,894

3 Claims. (Cl. 33—60)

This invention relates generally to instruments, and more particularly to an instrument for use in leveling railways and comprising a telescope mounted on a turn-table which is secured to a bracket which is removably supported on a rail, the device being adapted for use with a sight board or target and blocks adapted for removable placement on the rail between the telescope and the said target, whereby the work of leveling the track between said target and telescope is facilitated.

A primary object of this invention is to provide a device of this character which is particularly well adapted for easy mounting on a rail, and for quick leveling of the instrument itself.

Another object of this invention is to provide a method of mounting a telescope on a turn-table and bracket whereby the telescope will be approximately correctly aimed by simply attaching the bracket to the rail, and to provide very simple and accurate means for perfecting the aiming of the telescope.

Still another object of this invention is to provide a device of this character which is suitable for use on curves in the railway track, and as well as on straight track.

A still further object of this invention is to provide means whereby one setting of the target, at a distance in the order of fifteen hundred feet from the telescope, will suffice for the complete operation of leveling the intervening portion of track.

With these objects definitely in view, this invention resides in certain novel features of construction, combination and arrangement of parts and portions as will be hereinafter described in detail in the specification, particularly pointed out in the appended claims and illustrated in the accompanying drawings which form a material part of this application, and in which:

Similar characters of reference designate similar or identical parts and portions throughout the specification and throughout the several views of the drawings.

Figure 1:
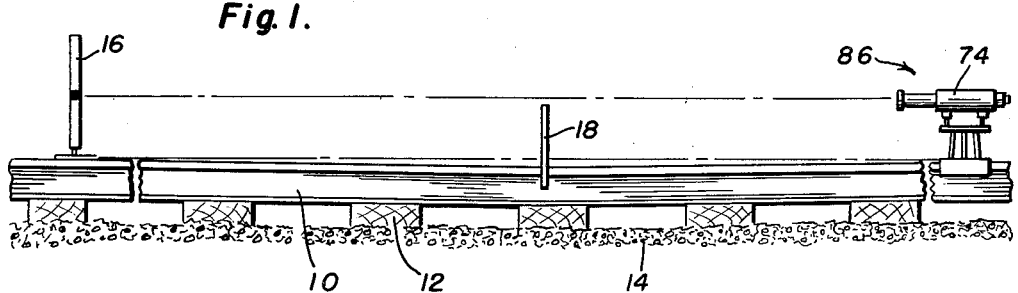
Figure 1 is a diagrammatic view of a portion of track, with this improved device and other equipment used in leveling the track shown in operative positions.

Referring now to the drawings in detail, it will be noted that the environment wherewith this invention is adapted to be used includes a rail 10, which may be constructed in sections, ties or sleepers 12 and ballast 14. The equipment wherewith this invention will be directly used also includes a sighting board 16 and spot block 18.

Figure 7:
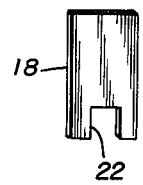
Figure 7 is a detailed perspective view of what is hereinafter referred to as a spot board block.
Figure 9:
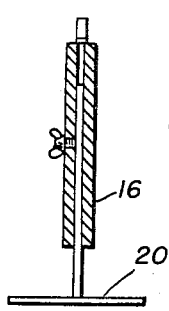
Figure 9 is a vertical sectional view taken through this sighting board and one of the stands shown in Figure 8.
Figure 4:
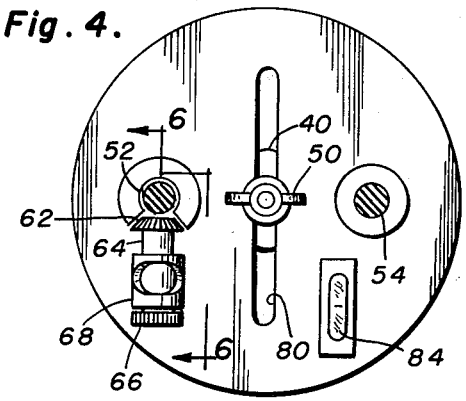
Figure 4 is a horizontal sectional view, taken on the line 4—4 in Figure 2.
Figure 6:
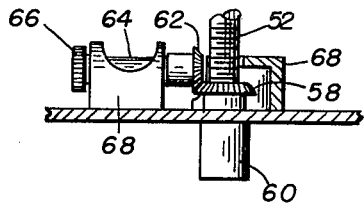
Figure 6 is a fragmentary detail view, taken on the irregular section line 6—6 in Figure 4.
Figure 3:
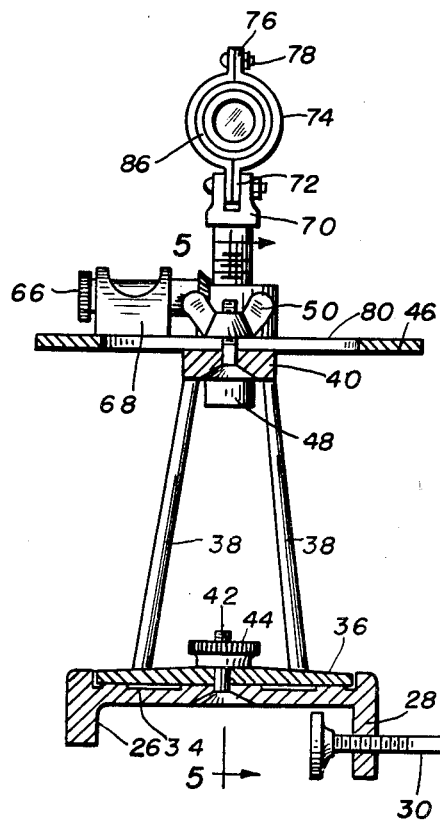
Figure 3 is a vertical sectional view, taken substantially on the center line 3—3 in Figure 2.
Figure 5:
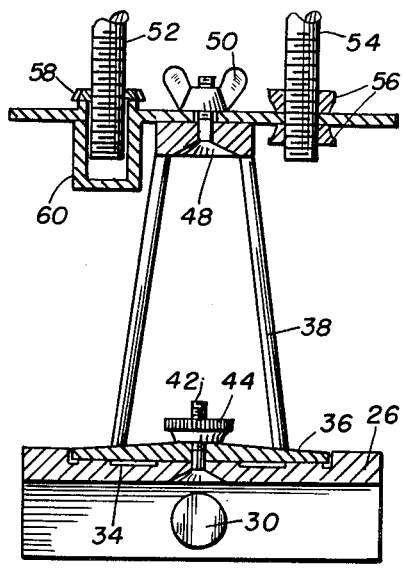
Figure 5 is a vertical sectional view, taken on the line 5—5 in Figure 3.
Figure 8:
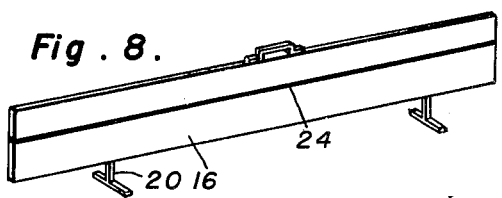
Figure 8 is a perspective view of what is hereinafter referred to as a sighting board, and the sighting board stands used to support this board on the rails.

The sighting board 16 will be placed on stands 20 which are T-shaped and securable to the sighting board by means of wing bolts 22, as shown in Figure 9. This sighting board 16 is carefully adjusted as to height and ordinarily will be carefully leveled, the positioning of the board, according to this invention, being possibly a very considerable distance along the track from the location of the leveling operations. The spot blocks 18 may be of very simple construction, as indicated in Figure 7, and will be placed on the rail or rails close to the rail jacks when the rail is being raised. It should be noted that the length of the spot block from the root of the slot 22 therein to the other end of the block is made to bear a definite relationship to the positioning of the line 24 disposed longitudinally on the sighting board 16. A line 24 will ordinarily be two inches wide and the operator will sight over the top of the spot block 18 to the upper or lower edge of this line, while the said spot block is being raised with the rail.

The telescopic instrument described herein comprises an essentially U-shaped bracket 26, one longer arm 28 of which is provided with a screw clamp 30 having a handle 32, and this bracket 26 is removably securably to the rail 10. The upper face of the bracket 26 is recessed and provided with carefully machined bearing surfaces 34, upon which rests the lower flat plate 36 of a tripod frame 38, the upper plate 40 of which is spaced a considerable distance above the lower plate 36, both these plates being cylindrical in shape and integrally secured to the leg portions of the tri-pod. The lower plate 36 is centrally apertured and the bolt 42 with a thumb nut 44 is used to adjustably secure this plate to the U-shaped bracket 26.

A flat plate turn-table 46 is centrally apertured and secured to the upper plate 40 of the tripod by means of a bolt 48 and wing nut 50, and this turn-table is apertured at points spaced substantially equally from the center thereof to receive the threaded end portions of two adjustable legs 52 and 54. The leg 54 is mounted on the turn-table by means of a pair of thumb nuts 56, one of which is positioned on either side of the turn-table, while the other leg 52 is supported by a bevel gear wheel 58 which rests on the upper end of a thimble-shaped bearing 60 on the turn-table 46. The bevel wheel gear 58 is driven by a coacting bevel gear wheel 62 on the end of a short shaft 64 which is equipped with a knurled knob 66 and is rotatably mounted on the turn-table 46 by means of a bracket bearing 68. This construction allows for the vertical adjustability of both legs 52 and 54, fine adjustment being ordinarily carried out by turning the knurled knob 66.

The upper end of the legs 52 and 54 are pivotally secured, as at 70, to depending lugs 72 of the telescope attaching bracket 74, this bracket having upstanding lugs 76 which are secured together by bolts 78 to hold the telescope firmly within the bracket. It should be noted that the legs 52 and 54 and the other structure recited immediately above are so arranged as to allow the provision of an elongated slot 80 in the turn-table, thus allowing for the adjustment of the turn-table transversely of the rail.

Figure 2:
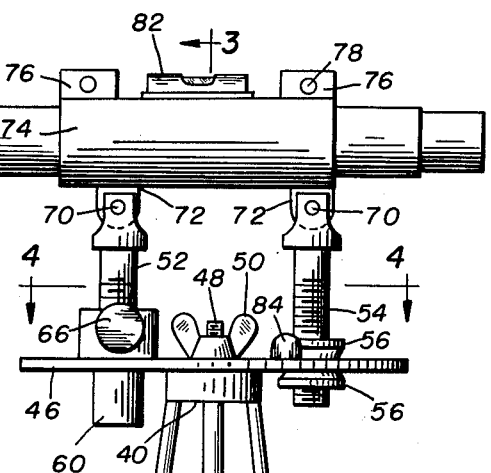
Figure 2 is an enlarged side elevational view of this device and a portion of a rail.

A level 82 is secured to the upper portion of one of the halves of the telescope attaching bracket 74, and another level 84 is mounted on the turn-table 46, these levels being arranged to facilitate the leveling of the device in two planes. The telescope, generally indicated by the numeral 86 may be of any suitable character, the drawings showing the eye-piece disposed as to the right in Figures 1 and 2, and the intermediate portion of the telescope being removably mounted within the bracket 74. The operation of this invention will be reasonably clearly understood from the foregoing description of the mechanical details thereof, taken in connection with the above recitation of the objects sought to be achieved by this invention but it may be added in recapitulation, that the sighting board 16 is first upwardly positioned transversely of the track, with the line 24 thereon accurately spaced at a predetermined height above the rail. The spot blocks 18 are placed on the rails adjacent the jacks used to raise the rails, it being understood that these jacks will ordinarily raise the ties or sleepers 12 and that the ballast may be forced under these sleepers for the permanent support of the rails. The instrument described herein is clamped to the rail by means of the U-shaped bracket 26 and the frame, turn-table 46, and legs 52 and 54 are adjusted in order that the reticule of the telescope will be brought into correct position or aim with the line 24 on the sighting board. The levels 82 and 84 aid in checking this correct alignment and positioning of the telescope. A considerable length of track between the sighting board and the telescope may now be leveled without resetting of the said sighting board and telescope, it being a feature of this invention to lessen the number of settings required.

Although there has been shown a particular embodiment of this invention, this application is not limited to this particular embodiment, but it is desired to include in the scope of this invention the construction, combination and arrangement of parts and portions as substantially set forth in the appended claims.

What is claimed as new and desired to secure by Letters Patent is:

1. An instrument for use in leveling railway track comprising a bracket removably securable to a rail, a frame rotatably mounted on said bracket and including a horizontal upper plate, a turn-table having a slot and a bolt extending through said plate and slot whereby the turn-table is horizontally adjustable relative to said plate, a telescope on said turn-table, a level fixed on said turn-table, said telescope having an attaching bracket supported on a pair of legs and pivoted to the upper ends of said legs, and said legs being each vertically adjustably secured on said turn-table.

2. An instrument for use in leveling railway track comprising a bracket removably securable to a rail, a frame rotatably mounted on said bracket and including a horizontal upper plate, a turn-table having a slot and a bolt extending through said plate and slot whereby the turn-table is horizontally adjustable relative to said plate, a telescope on said turn-table, a level fixed on said turn-table, said telescope having an attaching bracket supported on a pair of legs and pivoted to the upper ends of said legs, and said legs being each vertically adjustably secured on said turn-table, one of said levels being mounted on the top of said attaching bracket and parallel to the axis of said telescope.

3. An instrument for use in leveling railway track comprising a bracket removably securable to a rail, a frame rotatably mounted on said bracket and including a horizontal upper plate, a turn-table having a slot and a bolt extending through said plate and slot whereby the turn-table is horizontally adjustable relative to said plate, a telescope on said turn-table, a level fixed on said turn-table, said telescope having an attaching bracket supported on a pair of legs and pivoted to the upper ends of said legs, and said legs being each vertically adjustably secured on said turn-table, a bearing on said turn-table and a nut on the bearing, one of said legs being threaded, said leg being threaded through said nut, an external gear on said nut, a coacting gear to engage said gear, a shaft mounted on said turn-table to carry said coacting gear, and a knob on said shaft to facilitate rotation of the shaft.

SAMUEL A. BOWERS.

REFERENCES CITED

The following references are of record in the file of this patent:

UNITED STATES PATENTS

| Number | Name | Date |
|---|---|---|
| 420,245 | Rose | Jan. 28, 1890 |
| 1,174,034 | Adams | Mar. 7, 1916 |
| 1,199,059 | Doty | Sept. 26, 1916 |
| 1,239,083 | Clark | Sept. 4, 1917 |
| 1,359,133 | Weed | Nov. 16, 1920 |
| 1,366,498 | Schauff | Jan. 25, 1921 |
| 1,927,178 | Lemaire | Sept. 19, 1933 |
| 2,414,777 | Thomas | Jan. 21, 1947 |

FOREIGN PATENTS

| Number | Country | Date |
|---|---|---|
| 409,365 | Great Britain | of 1932 |